Jan. 16, 1962　　　　O. TODNEM　　　　3,016,737
APPARATUS FOR DETERMINING THE MOISTURE IN
CEREALS, GRASS, STRAW
AND OTHER PRODUCTS
Filed Nov. 26, 1957
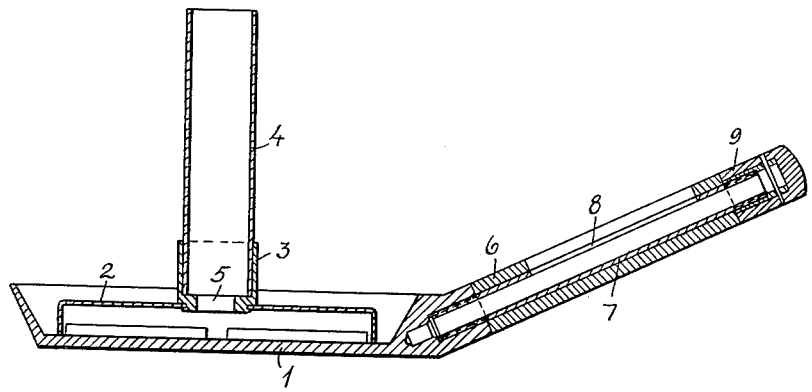
Inventor:
ODD TODNEM
By　/s/ Attorney United States Patent Office 3,016,737
Patented Jan. 16, 1962

1

3,016,737
APPARATUS FOR DETERMINING THE MOISTURE IN CEREALS, GRASS, STRAW AND OTHER PRODUCTS
Odd Todnem, Norges Tekniske Hogskole, Trondheim, Norway, assignor to Landbruksteknisk Institutt, Vollebekk, Norway, a corporation of Vollebekk, Norway
Filed Nov. 26, 1957, Ser. No. 699,105
Claims priority, application Norway Nov. 27, 1956
2 Claims. (Cl. 73—76)

This invention relates to an apparatus for determining the moisture in grain, grass, straw and other products, wherein the product in question is arranged in a covered space upon a pan which is heated to a definite temperature, upon a hot plate and the moisture content is determined by weighing before and after desiccation. The invention is characterized by the point of time for complete expelling of the water from the sample being determined by the usee of a dew pipe.

The apparatus used for this purpose consists of a metal pan with a superposed cover and is characterized by an open dew pipe preferably of glass, projecting upwards from the space between the pan and the cover, and a thermometer pipe in heat conducting connection with the pan. The thermometer pipe may extend to the side from the pan and is adapted for the insertion of a thermometer and provided with a longitudinal slit wherein the temperature may be read.

The drawing shows an embodiment of the apparatus in section. A pan 1 of cast iron is adapted for use upon a hot plate, and a cover 2 of aluminum or of stainless steel stands on short legs in the bottom of the pan. A heat-insulated holder 3 carrying a glass pipe 4 is attached to the cover 2. The holder has an extension 5 within the pan so that the air under the cover passes up through the glass pipe. The pan is provided with a handle 6 having a pipe 7 to receive a thermometer which may be read through a slit 8 in the handle. The handle is heat-insulated by the use of suitable insulating material. The rearmost portion 9 of the handle may be screwed off, so that it is possible to take out the thermometer or put it into the pipe 7.

2

The pan is placed upon a hot plate and heated so that the temperature remains between 185 and 200° C. For example, 50 gr. of grain may be distributed over the bottom of the pan beneath the cover and the cover replaced. The pan is then heated to evaporate the water in the grain and some of the vapor is condensed upon the glass pipe. The temperature is held between the given limits and the pan is held at this temperature for a minimum 10 min. and a maximum 18 min. for grain. If the dew is exhausted when 10 min. have passed, the moisture has been completely expelled, if not, heating is continued until the dew disappears from the dew pipe, but for grain never for a longer time than 18 min. The grain is taken out, and weighed and the water content in percent is calculated on the basis of the two weighings. In all cases the pan must not stand upon the plate for more than 18 min. for grain, because the grain would be burnt. Corresponding limiting times may be fixed for other products.

I claim:

1. An apparatus for determining the moisture content of material comprising a metal pan adapted to receive said material for heating therein and a cover disposed on said pan above said material to provide an enclosed space in which said material is heated for driving off moisture therefrom, and an exteriorly open transparent dew pipe carried by said cover and communicating with said enclosed space, said dew pipe having a length such that moisture from said material condenses thereon.

2. An apparatus as set forth in claim 1 in which said dew pipe is composed of glass.

References Cited in the file of this patent
UNITED STATES PATENTS

| | | |
|---|---|---|
| 75,829 | Babbitt | Mar. 24, 1868 |
| 1,159,500 | Kelly | Nov. 9, 1915 |
| 2,281,182 | Chopin | Apr. 28, 1942 |
| 2,282,654 | Horner | May 12, 1942 |
| 2,524,554 | White | Oct. 3, 1950 |

FOREIGN PATENTS

| | | |
|---|---|---|
| 718,444 | Great Britain | Nov. 17, 1954 |